United States Patent [19]
Carr

[11] 4,103,261
[45] Jul. 25, 1978

[54] LASER BEAM SHUTTER AND BEAM INDICATOR

[75] Inventor: John M. Carr, Lafayette, Ind.

[73] Assignee: Duncan Electric Company, Inc., Lafayette, Ind.

[21] Appl. No.: 699,784

[22] Filed: Jun. 25, 1976

[51] Int. Cl.² .............................................. H01S 3/10
[52] U.S. Cl. .................................. 332/7.51; 250/229; 250/230; 350/266
[58] Field of Search ............... 332/7.51; 250/229, 230; 350/266, 272, 273, 275, 96 B, 96 WG; 240/1 LP

[56] References Cited
U.S. PATENT DOCUMENTS

| 1,457,426 | 6/1923 | Cameron | 350/100 |
| 2,672,841 | 3/1954 | Nitzberg | 350/96 R |
| 3,619,037 | 11/1971 | Pugh | 332/7.51 |
| 3,902,142 | 8/1975 | Van der Berg | 350/273 |
| 3,931,593 | 1/1976 | Marshall | 331/94.50 |

*Primary Examiner*—Nelson Moskowitz
*Attorney, Agent, or Firm*—John R. Nesbitt

[57] ABSTRACT

A combined laser beam shutter and beam "on-off" indicator is disclosed. A rotatable shutter pin is mounted in a beam interrupting positon with the shutter having an aperture thereon which, when the pin is rotated to the proper position, permits passage of the light therethrough. The shutter pin is adapted, when in closed position, to reflect visible light caused by the laser to a position for observation thereby indicating that the beam is "on".

5 Claims, 3 Drawing Figures

LASER BEAM SHUTTER AND BEAM INDICATOR

FIELD OF THE INVENTION

This invention relates to a combined laser beam shutter and beam "on-off" visual indicator.

BACKGROUND OF THE INVENTION

Laser beams are gaining increasing acceptance in many industrial, commercial and consumer uses. One new use for laser beams is disclosed in U.S. Pat. application Ser. No. 681,794, filed Apr. 30, 1976 by Graefnitz, such use being for testing an electric meter for accuracy. As a result of such increased use, Class II (and above) lasers (which are the classes used in most industrial applications) have come in for increased regulation by federal authorities. For example, the FDA has proposed regulations, as set forth in the Federal Register, Vol. 40, No. 148, p. 32252 et seq. These regulations, among other things, specifically approve a "pilot light" type of laser beam shutter and indicator as follows (at p. 32255):

"It was always the intent of the Food and Drug Administration that, for Class II laser products, the use of the laser energy source to activate the emission indicator would be acceptable".

When using laser beams, there is a need to be able to shut off or stop the laser beam while the plasma tube is still emitting. Further, it is necessary to indicate in some visible manner that the plasma tube is still emitting but the beam is stopped from exiting through the orifice opening provided. Therefore, a need exists for a simple, inexpensive laser beam shutter and beam indicator that is fool-proof and reliable. Since no device is known to date, this disclosure describes such a device as well as several variations.

SUMMARY OF THE INVENTION

It is the object of this invention to provide a combined laser beam shutter and "on-off" beam indicator when the shutter is closed.

It is a further object of this invention to provide a low cost and failure proof combined laser beam shutter and "on-off" beam indicator.

THE DRAWINGS

DESCRIPTION OF THE INVENTION

Figure 1:
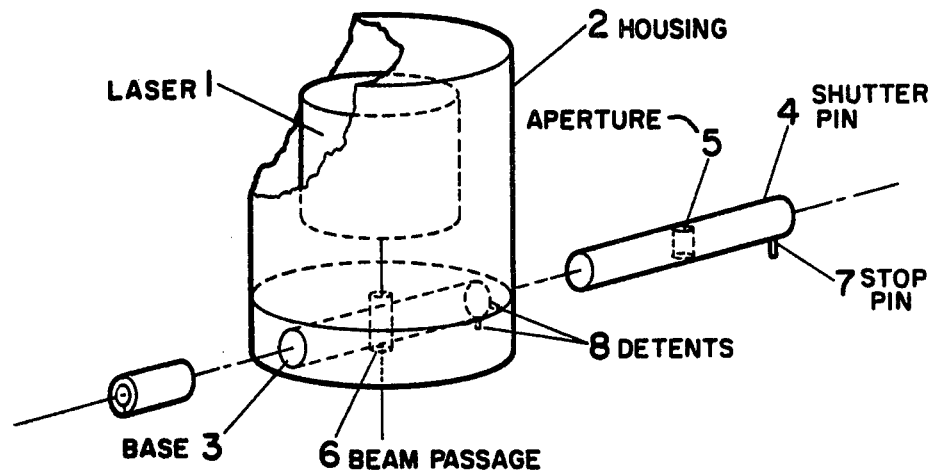
FIG. 1 is an exploded perspective view of a laser beam assembly equipped with the combined beam shutter and "on-off" indicator of this invention.

The laser plasma tube 1 is mounted inside a housing 2 which supports and directs the laser beam in the desired direction. A unit such as that depicted is commercially available, for example such a device is manufactured and sold by Spectra-Physics, as their model 136.

A base 3 is made transverse of housing 2, said base being sized to receive shutter pin 4. Pin 4 has an aperture 5 located so that, when the shutter pin is inserted in the housing base, said aperture may be rotated into alignment with laser beam passage 6. A stop pin 7 may be provided to cooperate with detents 8 on the housing to limit rotation of the shutter pin between beam passing and beam interrupting positions.

Figure 2:
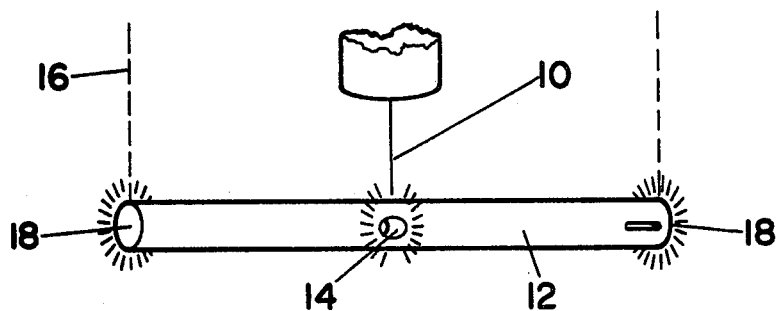
FIG. 2 is a schematic view of one embodiment of the beam shutter in "off" position.

FIG. 2 shows a pin as it would appear when in a beam interrupting position. The laser beam 10 is active and strikes pin 12 because the shutter pin aperture 14 has been positioned in a beam interrupting position. The pin 12 is made of translucent material and the distance from the point where the beam strikes the pin to the outside of the housing 16 (indicated in phantom lines) is short enough so that a bright glow may be observed at the ends 18 of the shutter pin. By simple visual observation it is instantly realized that the laser is energized even though no beam is exiting the laser beam passage in the housing.

Figure 3:
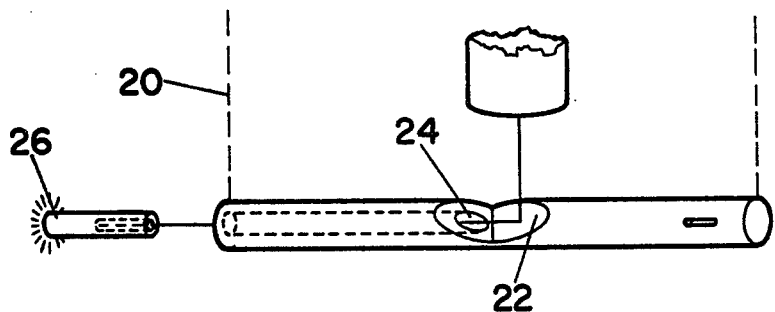
FIG. 3 is a schematic view of another embodiment of the beam shutter in "off" position.

The embodiment shown in FIG. 3 is somewhat more practical when the housing 20 is wide in that the beam (when the shutter pin is in blocking position) is reflected by reflective surface 22 through indicator bore 24 in the shutter pin to indicator inset 26 which is made of plexiglas or other clear material so that a visual indication of the laser beam is displayed at an external point on the laser housing even though no laser radiation is exiting the housing.

It will be readily appreciated that a clear or translucent beam indicator may be inserted in the shutter pin indicator bore, thereby permitting the use of a totally opaque shutter pin where that may be desirable.

I claim:

1. A unitary laser beam shutter and laser "on-off" indicator for use with a laser beam source comprising:
   a unitary shutter and "on-off" indicator means movable between beam passing and beam interrupting position;
   said unitary shutter and "on-off" indicator means being adapted, when in the beam interrupting position, to direct reflected light from the laser beam to a visually observable position from which position light is emitted from said unitary means whereby the "on" condition of the laser is positively indicated.

2. The laser beam shutter and "on-off" indicator described in claim 1 wherein:
   said shutter means is comprised of a pin having an aperture therein, said pin being rotatable in the path of a laser beam source between a beam passing position and a beam interrupting position;
   said shutter means being translucent, whereby when the shutter is in beam interrupting position the pin conducts reflected laser light to the ends of said pin thereby giving a visual indication of laser "on" condition.

3. The laser beam shutter and "on-off" indicator described in claim 1 wherein:
   said shutter means is comprised of a pin having an aperture therein, said pin being rotatable in the path of a laser beam source between a beam passing position and a beam interrupting position;
   said shutter also including an indicator bore in communication with said shutter aperture;
   said aperture also including a reflective surface positioned to reflect laser light through said indicator bore to a remote location;
   display means connected to said shutter pin and blocking egress of laser light from said indicator bore whereby laser light cannot be reflected to the exterior of the shutter means when in beam interrupting position but whereby the "on" condition of the laser is indicated on said display means.

4. The device according to claim 3 in which said display means is comprised of either transparent or translucent material.

5. A combined laser beam shutter and laser "on-off" indicator comprising:
- a laser beam source;
- a housing in which said laser beam source is mounted with said housing including a laser beam passage;
- a transverse aperture in said housing;
- shutter means adapted for insertion in said transverse aperture;
- said shutter means including an aperture adapted to pass a laser beam when in one position and to block a laser beam when in another position;
- light reflecing means located in said shutter means so that, when said shutter is in laser blocking position, the laser light is reflected to a point remote from the point of interruption of said laser beam, said remote point being located at the exterior of said housing in a visually observable location whereby the "on" condition of the laser source is indicated even though laser beam emission from said laser beam passage is blocked.

* * * * *